United States Patent Office 3,385,820
Patented May 28, 1968

3,385,820
POLYURETHANES STABILIZED WITH A MIXTURE OF PHENOLS
Joseph Burton Finlay, Wilmington, Del., assignor to E. I. du Pont de Nemours and Company, Wilmington, Del., a corporation of Delaware
No Drawing. Filed Feb. 25, 1966, Ser. No. 529,963
3 Claims. (Cl. 260—45.95)

This invention relates to the stabilization of thermoplastic polyalkyleneether polyurethanes and polyurethaneamides against heat- and light-induced degradation by a synergistic combination of certain phenolic stabilizers, used in particular concentrations.

Thermoplastic polyalkyleneether polyurethanes and polyurethaneamides, such as those described in U.S. Patents 2,929,802 and 2,929,801, are particularly useful in manufactured goods formed by injection or compression molding or extrusion forming, without subsequent curing treatment, but which need to show elastic or resilient behavior similar to that of conventional vulcanized rubbers. These polyurethanes are unfortunately subject to a certain amount of degradation when exposed to heat and/or light, with corresponding loss of strength and resiliency. It is well known that these degradative effects can be combatted by the incorporation of stabilizers such as phenols, aromatic amines, benzophenones, hydroxyazines, oximes, metal salts, and so on, as mentioned for instance in U.S. Patents 2,929,801 and 2,984,645. A continuing need has existed, however, for more effective, more efficient, and more economical stabilizers for thermoplastic polyurethane type materials.

It has been discovered that thermoplastic polyalkyleneether polyurethanes, including polyurethaneamides, may be stabilized against heat- and light-induced degradation by incorporating therein about 0.25% to 2% by weight, based on the weight of the polyurethane, of a mixture of (A) 4,4'-butylidene-bis-(2-t-butyl-5-methyl phenol) and (B) 2,2'-methylene-bis-(4-methyl-6-t-butyl phenol) with the proviso that the weight ratio of (A) to (B) present is in the range of 2:1 to 9:1.

This relatively low concentration of a combination of two well-known phenolic antioxidants, in particular weight ratios, is far more effective in stabilizing thermoplastic polyurethanes than larger concentrations of either one of the phenolic antioxidants used alone. This unpredictable synergistic effect of the two antioxidants makes practical the employment of these highly useful thermoplastic polyurethanes under conditions of exposure from which they were previously excluded because of their sensitivity to heat and light.

The thermoplastic polyurethanes and polyurethaneamides stabilized by the method of this invention are prepared essentially by the method of Katz, as described in U.S. Patent 2,929,802. That is, they are made by contacting a solution of a bischloroformate of a polyalkyleneether glycol of molecular weight in the range 350 to 3000, and, optionally, a bischloroformate of a low molecular weight glycol in an inert solvent such as benzene, toluene, chloroform, methylene chloride, and so on, with an aqueous solution of a diamine such as ethylene diamine, hexamethylene diamine, piperazine, methyl substituted piperazines, and so on. A diacid chloride such as adipyl chloride may also be included in the reaction mixture, in which case amide groups as well as urethane groups are formed in the resulting polymer. An acid acceptor such as sodium carbonate is generally included in the aqueous phase, although excess amine can also be used for the same purpose. Polyurethanes that are particularly suitable for stabilization by the method of this invention are those made by reacting polytetramethyleneether glycol (PTMEG) and 1,4-butanediol (BDO) bischloroformates with piperazine or 1,6-hexamethylene diamine. The polyurethane especially preferred is made from 0.25 mole of PTMEG of average molecular weight 1000, 0.75 mole of PTMEG of average molecular weight 2000, 4.0 moles of BDO, and 5.0 moles of piperazine. The polyurethane employed in the following examples is of this preferred composition.

The synergistic combination of stabilizers according to this invention consists of Stabilizer A, 4,4'-butylidene-bis-(2-t-butyl-5-methyl phenol), and Stabilizer B, 2,2'-methylene-bis-(4-methyl-6-t-butyl phenol). Stabilizer A is available commercially as "Santowhite Powder," and stabilizer B is available commercially as "Plastanox" 2246. The unexpected finding of this invention is that the combination of these agents, in the range of weight ratios of 2:1 to 9:1 A to B is much more effective than either agent used alone, as illustrated in the following examples. The total amount of stabilizer required is about 0.25 to 2 parts by weight per 100 parts of the polymer to be stabilized.

The antioxidants may be incorporated in the polyurethane by adding them in the same inert solvent as is used in making the polymer, after the polymer-forming reaction is complete but before the polymer is isolated from the reaction mass. It is of course, also possible to incorporate the antioxidant mixture in the isolated polymer by conventional milling or mixing procedures or to incorporate the stabilizers in the bischloroformate solution before the polymer-forming reaction is carried out.

Polyurethanes stabilized by the method of this invention show surprisingly good resistance to thermal degradation and also resist degradation by exposure to ultraviolet light, as shown more particularly by the following examples. These examples are given to bettter illustrate the present invention, and it is not intended that it be limited thereby. Parts are given by weight.

The general procedures employed for preparing the polyurethanes and incorporating stabilizers of this invention, therein, as well as the methods for testing performance are as follows:

A thermoplastic polyetherurethane elastomer is prepared from the mixed bischloroformates of an 0.25 molar proportion of PTMEG of molecular weight 1000, an 0.75 molar proportion of PTMEG of molecular weight 2000, and 4.0 molar proportions of 1,4-butanediol with 5.0 molar proportions of piperazine, according to the procedure of U.S. Patent 2,929,802, using methylene chloride as the solvent. To an emulsion comprising 210 parts of this polyetherurethane, 2760 parts of methylene chloride and 750 parts of water, there is added various amounts of 4,4'-butylidene-bis-(2-t-butyl-5-methyl phenol) (A) and 2,2'-methylene-bis-(4-methyl-6-t-butyl phenol) (B) in 134 parts of methylene chloride. The emulsion is stirred in a liquefier-blender, and the methylene chloride is distilled off using hot water and live steam to supply the necessary heat. The polymer crumb, in which the antioxidant is now incorporated, is filtered off and dried overnight at 100° C. in a vacuum oven under nitrogen bleed. The dried polymer is pressed between aluminum sheets at 200–210° C. into film approximately .020 inch thick. Strips ¼ inch wide x 4 inches long are suspended on stainless steel hooks in a large glass tube closed at one end and fitted with a 2-hole stopper in which two 10 mm. pieces of glass tubing have been placed at different heights so as to provide a conviction current of air, the whole assembly being placed in a thermostated aluminum block held at 121° C. (ASTM Test Method D865-62). Single strips are removed after various periods of aging and the stress-strain properties and inherent viscosity (m-cresol, 30° C., 0.1%) of the aged piece are determined.

Example 1

In order to illustrate the stability which polyurethanes containing the stabilizers of this invention exhibit against heat degradation, several samples of the thermoplastic polyurethane described in the above general procedure are prepared with various amounts of the two phenols incorporated therein. The compositions of the samples are as follows:

| Sample No. | Ratio of Stabilizers A to B present | Total Amount of Stabilizer in percent by Weight |
|---|---|---|
| 1 | 3:1 | 1.0 |
| 2 | 3:1 | 0.25 |
| 3 | 3:1 | 2.0 |
| 4 | 2:1 | 1.0 |
| 5 | 9:1 | 1.0 |

NOTE.—A=4,4'-butylidene-bis-(2-t-butyl-5-methyl phenol); B=2,2'-methylene-bis-(4-methyl-6-t-butyl phenol).

The above samples are suspended in the thermostated aluminum block as described in the general procedure and are removed after various periods of aging. The stress-strain properties (tensile strength at break, $T_B$) and inherent viscosity ($\eta_{inh}$) of each aged sample are determined after the aging periods indicated below; results are as follows:

| Sample No. | | Days at 121° C. | | | | | | | |
|---|---|---|---|---|---|---|---|---|---|
| | | 0 | 7 | 14 | 21 | 28 | 35 | 42 | 49 | 56 |
| 1 | $T_B$ | 6,000 | 6,200 | 4,300 | 3,500 | 2,900 | | | | |
| | $\eta_{inh}$ | 2.88 | 2.80 | 2.10 | 1.85 | 1.62 | | | | |
| 2 | $T_B$ | 5,700 | 5,200 | 3,400 | 650 | 250 | (¹) | | | |
| | $\eta_{inh}$ | 3.41 | 2.49 | 1.87 | 1.17 | 0.86 | | | | |
| 3 | $T_B$ | 5,700 | 4,650 | 3,400 | 3,100 | 2,000 | 1,500 | 1,125 | 750 | 660 |
| | $\eta_{inh}$ | 3.22 | 2.16 | 1.74 | 1.53 | 1.25 | 1.11 | 0.96 | 0.83 | 0.84 |
| 4 | $T_B$ | 5,700 | 5,000 | 3,450 | 3,350 | 2,650 | 2,000 | 1,925 | 1,300 | 840 |
| | $\eta_{inh}$ | 3.24 | 2.32 | 1.98 | 1.67 | 1.41 | 1.44 | 1.10 | 0.99 | 0.82 |
| 5 | $T_B$ | 6,100 | 5,000 | 3,400 | 3,250 | 2,100 | 750 | 750 | 450 | (¹) |
| | $\eta_{inh}$ | 3.19 | 2.35 | 1.93 | 1.68 | 1.23 | 0.91 | 0.76 | 0.67 | |

Samples prepared and tested in the same fashion with the exception that they have comparable amounts of either stabilizer A or B alone incorporated in the polyurethane, have substantially less tensile strength or fail sooner than corresponding samples having both A and B incorporated.

Example 2

The stability which polyurethanes containing the stabilizers of this invention exhibit against light degradation is shown by the following test:

Three samples (1–3) are prepared having the following compositions:

Sample 1 is identical to sample 1 of Example 1.

Sample 2 contains 1 part of stabilizer B per 100 parts of polyurethane.

Sample 3 contains 1 part of stabilizer A per 100 parts of polyurethane.

Samples 2 and 3 are outside the scope of the invention and are included for illustrative purposes only.

Test strips are exposed in a single-arc (violet-arc) Fade-Ometer at a distance of 10 inches from the arc, the strips being examined at 20-hour intervals until they have failed, failure being indicated by loss of tensile properties to the extent that the strip breaks at less than an estimated 25% extension. The results are as follows:

| Sample No.: | Fade-Ometer hours to fail |
|---|---|
| 1 | 80 |
| 2 (control) | 60 |
| 3 (control) | 60 |

As many widely different embodiments of this invention may be made without departing from the spirit and scope thereof, it is to be understood that this invention is not limited to the specific embodiments thereof except as defined in the appended claims.

What is claimed is:

1. A thermoplastic elastomeric composition stabilized against heat- and light-induced degradation consisting essentially of an elastomer from the group consisting of polyurethanes and polyalkyleneether polyurethaneamides, having incorporated therein about 0.25–2% by weight, based on the weight of the elastomer, of a stabilizing mixture of (A) 4,4'-butylidene-bis(2-t-butyl-5-methyl phenol) and (B) 2,2'-methylene-bis(4-methyl-6-t-butyl phenol) wherein the weight ratio of A to B is in the range of 2:1 to 9:1.

2. The composition of claim 1 in which the thermoplastic elastomer is prepared by reacting a mixture of the bischloroformates of about 0.25 mole of polytetramethyleneether glycol of molecular weight 1000, 0.75 mole of polytetramethyleneether glycol of molecular weight 2000 and about 4 moles of 1,4-butanediol with about 5 moles of piperazine.

3. The composition of claim 1 in which the combined weight of stabilizers A and B is 1 to 2% by weight of the elastomer and the weight ratio of A to B is from about 2:1 to 3:1.

References Cited

UNITED STATES PATENTS 2,929,802   3/1960   Katz _____ 260—45.95
2,984,645   5/1961   Hoeschele _____ 260—45.95

DONALD E. CZAJA, *Primary Examiner.*

HOSEA E. TAYLOR, JR., *Assistant Examiner.*